United States Patent [19]

Day

[11] Patent Number: 5,462,623
[45] Date of Patent: Oct. 31, 1995

[54] METHOD OF PRODUCTION OF REINFORCED FOAM CORES

[75] Inventor: Stephen W. Day, Dayton, Ohio

[73] Assignee: WebCore Technologies, Inc., Centerville, Ohio

[21] Appl. No.: 102,892

[22] Filed: Aug. 6, 1993

Related U.S. Application Data

[63] Continuation-in-part of Ser. No. 877,985, May 4, 1992, abandoned.

[51] Int. Cl.$^6$ .............................. B32B 31/04; B32B 31/18
[52] U.S. Cl. ............................. 156/250; 156/264; 156/267; 156/79
[58] Field of Search ........................... 156/250, 264, 156/267, 78, 79; 428/304.4, 309.9, 317.5, 318.4

[56] References Cited

U.S. PATENT DOCUMENTS

| | | | |
|---|---|---|---|
| 2,053,173 | 9/1930 | Astima | 88/24 |
| 2,062,590 | 12/1936 | Lundquist | 156/264 X |
| 2,493,032 | 1/1950 | Rheinfrank, Jr. | 156/278 X |
| 3,070,475 | 12/1962 | Carlson, Jr. et al. | |
| 3,230,995 | 1/1966 | Shannon | 156/250 X |
| 3,243,492 | 3/1966 | Voelker | 156/79 X |
| 3,246,058 | 4/1966 | Voelker | |
| 3,264,153 | 8/1966 | Rodman et al. | 156/79 |
| 3,339,326 | 9/1967 | Derr et al. | |
| 3,526,556 | 9/1970 | Berner | |
| 3,544,417 | 12/1970 | Corzine | 156/300 |
| 3,549,449 | 12/1970 | Windecker | 156/254 |
| 3,708,385 | 1/1973 | Immethun | 428/119 |
| 3,733,235 | 5/1973 | De Ligt et al. | 156/264 X |
| 3,734,811 | 5/1973 | Small et al. | |
| 3,750,355 | 8/1973 | Blum | 52/612 |
| 3,841,958 | 9/1974 | Delorme | |
| 3,867,238 | 2/1975 | Johannsen | 156/259 |

(List continued on next page.)

FOREIGN PATENT DOCUMENTS

| | | | |
|---|---|---|---|
| 0446910 | 2/1948 | Canada | 156/264 |
| 0658023 | 2/1963 | Canada | 428/308.4 |
| 0245458 | 5/1926 | United Kingdom | 156/264 |
| 0548027 | 9/1942 | United Kingdom | 156/250 |
| 559527 | 6/1943 | United Kingdom | 156/264 |
| 0559527 | 2/1944 | United Kingdom | 156/264 |

OTHER PUBLICATIONS

"Sandwich Construction Today and Tomorrow", Howard G. Allen, author presented at The First International Conference on Sandwich Constructions, Ju. 19–21, 1989, Stockholm, Sweden; published in Sandwich Constructions 1, Karl–Axel Olsson and Ronnal P. Reichard, Eds., 1989.

*Primary Examiner*—David A. Simmons
*Assistant Examiner*—M. Curtis Mayes
*Attorney, Agent, or Firm*—Jacox, Meckstroth & Jenkins

[57] ABSTRACT

Rigid foam insulation boards and thin flexible fibrous sheets or strips are stacked in alternating layers with adhesive between the layers, and the stack is compressed while the adhesive cures to form a rectangular core panel or billet. In one embodiment, the parallel spaced sheets or strips extend diagonally of the panel or billet, and each billet is cut through the alternate layers of foam and fibrous sheets and along parallel spaced planes to form a plurality of core panels. The core panels are adhesively bonded between skins of rigid sheet materials to form laminated sandwich panels with the fibrous strips connecting the skins. The above stacking and curing steps are also performed with core panels in place of insulation boards to form a billet which is cut to form core panels with grid-like webs, and grid-like core panels are used to form a billet with the webs extending in X-Y-Z directions. Billets are also formed with core panels stacked in a step-like manner and then cut along inclined parallel planes to provide core panels with truss-like webs, and billets are formed with adjacent rigid foam boards having different densities and thicknesses, Resilient foam panels are used in place of or with the fibrous sheets for producing core panels which may be curved, and the foam between the webs of grid-like core panels is recessed to expose the webs for bonding surface materials such as stucco to the core panels.

12 Claims, 6 Drawing Sheets

U.S. PATENT DOCUMENTS

| | | | |
|---|---|---|---|
| 3,906,137 | 1/1974 | Bauer | 156/297 |
| 4,042,746 | 8/1977 | Hofer | 428/212 |
| 4,048,365 | 9/1977 | Hoover | 428/215 |
| 4,093,762 | 6/1978 | Kiefer | 156/250 X |
| 4,179,540 | 12/1979 | Smarook | 264/272.19 |
| 4,262,052 | 4/1981 | Kannan et al. | 428/306 |
| 4,330,494 | 5/1982 | Iwata et al. . | |
| 4,361,613 | 11/1982 | Bogner et al. | 428/119 |
| 4,411,939 | 10/1983 | Hawkins . | |
| 4,412,550 | 11/1983 | Wintermantel | 156/156 |
| 4,507,969 | 2/1989 | Shimodaira | 156/242 |
| 4,521,266 | 6/1955 | Careddi | 156/264 |
| 4,536,427 | 5/1955 | Kohn | 156/264 |
| 4,670,338 | 6/1987 | Clemmo | 428/49 |
| 5,060,291 | 10/1991 | Albertelli | 428/306.6 |
| 5,087,500 | 2/1992 | Kasper et al. | 428/116 |
| 5,182,150 | 1/1993 | Carlos et al. | 428/290 |
| 5,192,598 | 3/1993 | Forte et al. | 156/78 X |
| 5,234,969 | 8/1993 | Clark | 264/157 |
| 5,237,737 | 8/1993 | Zigler | 29/598 |

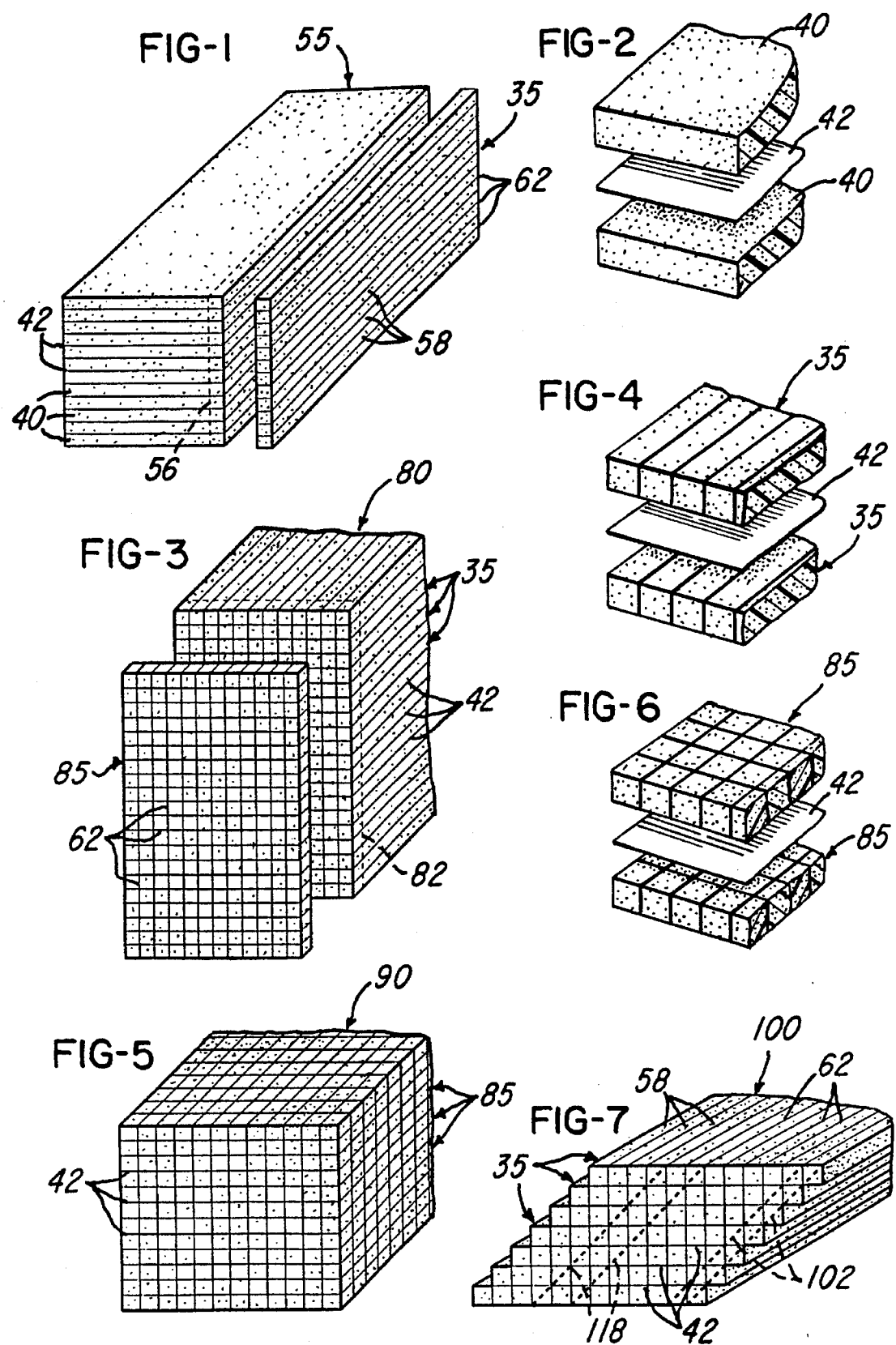

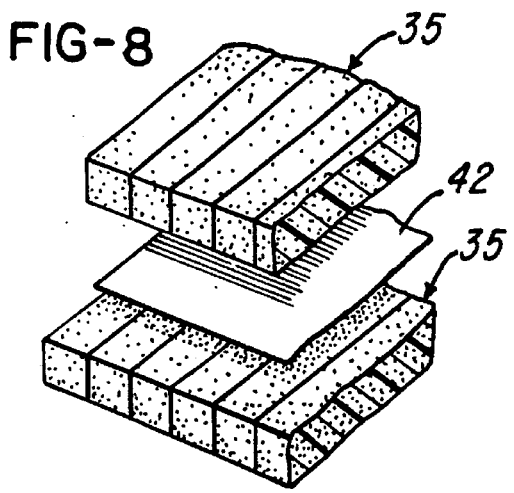
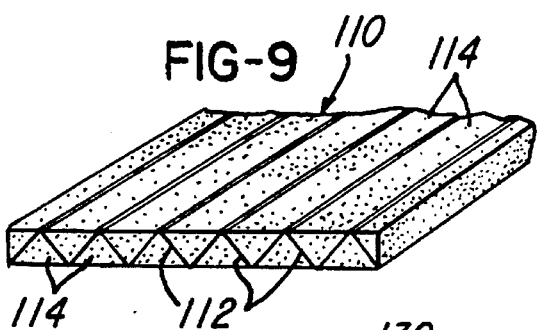
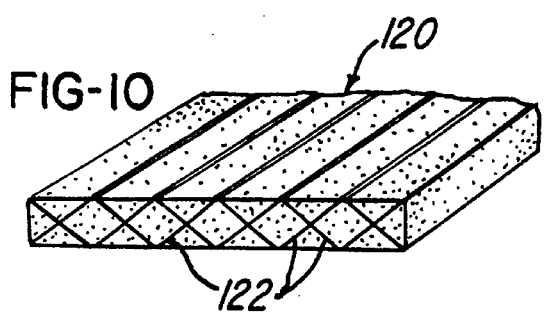
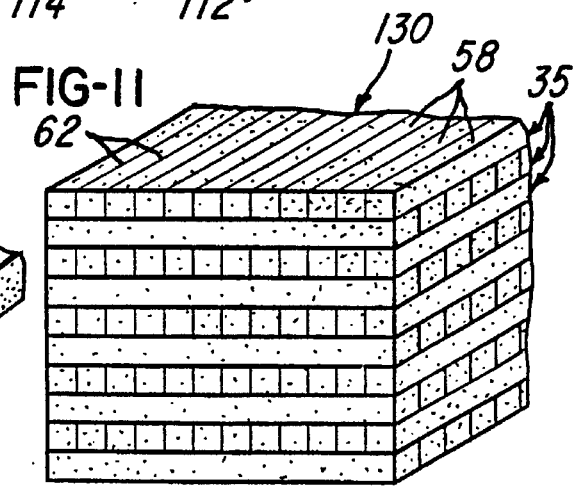
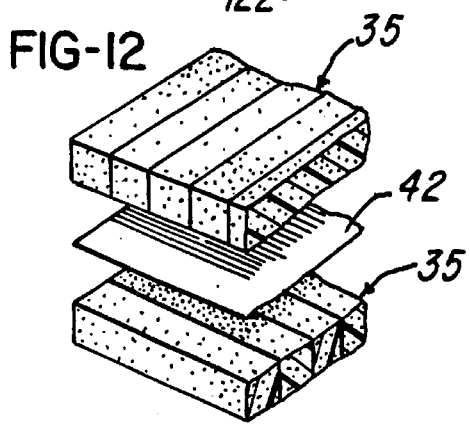
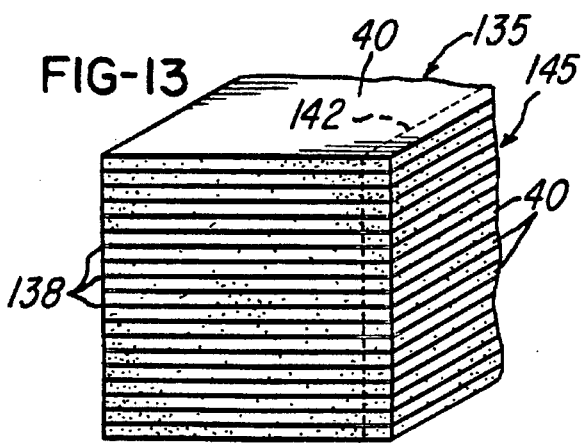
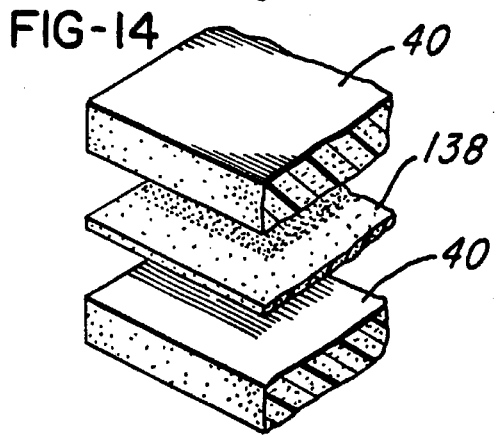
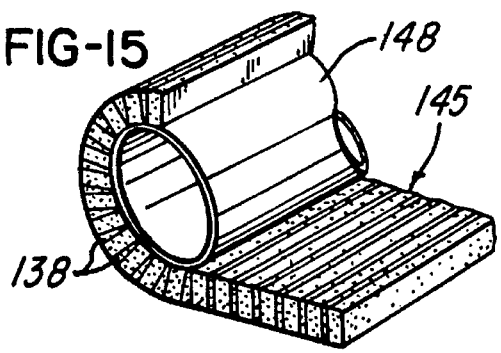

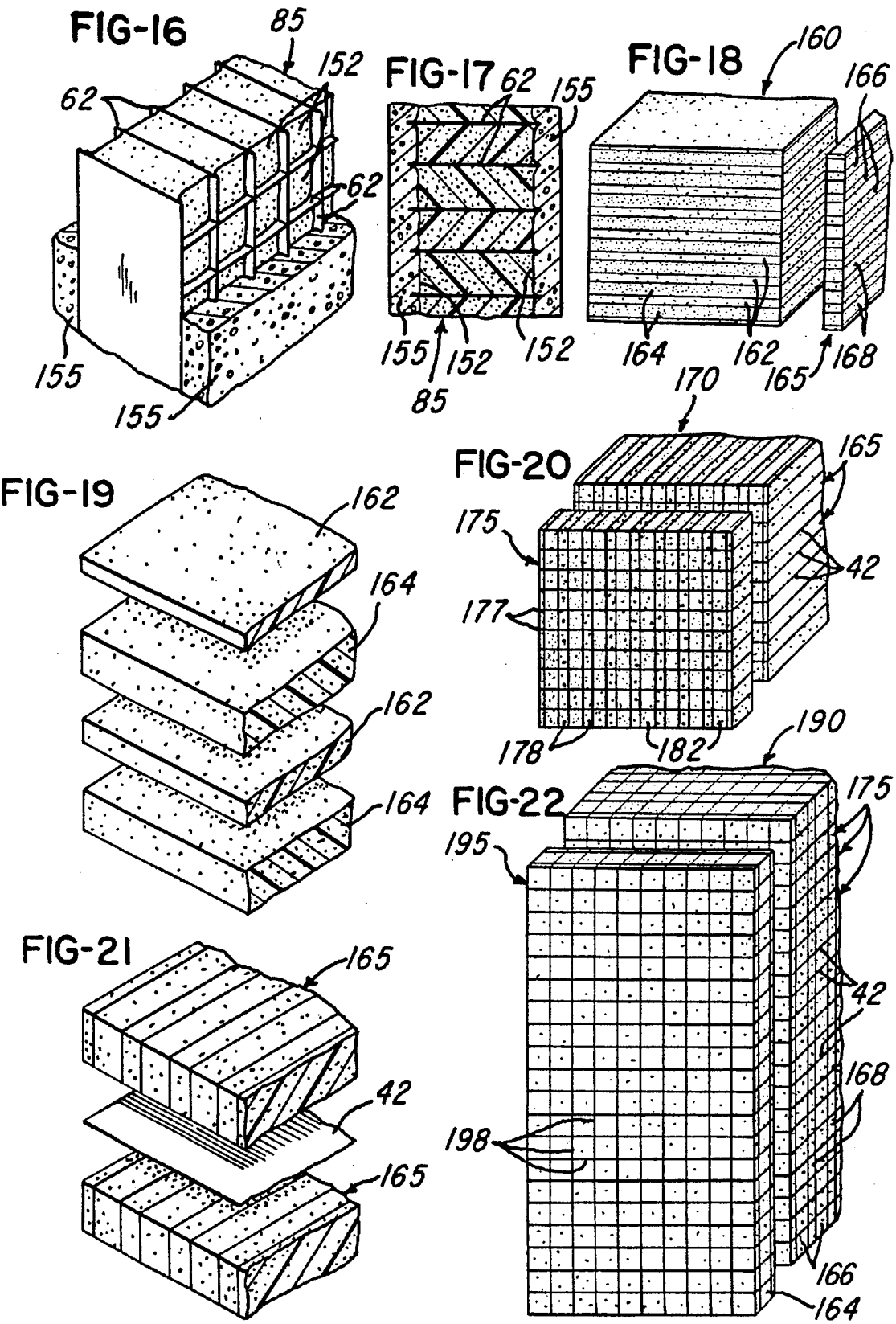

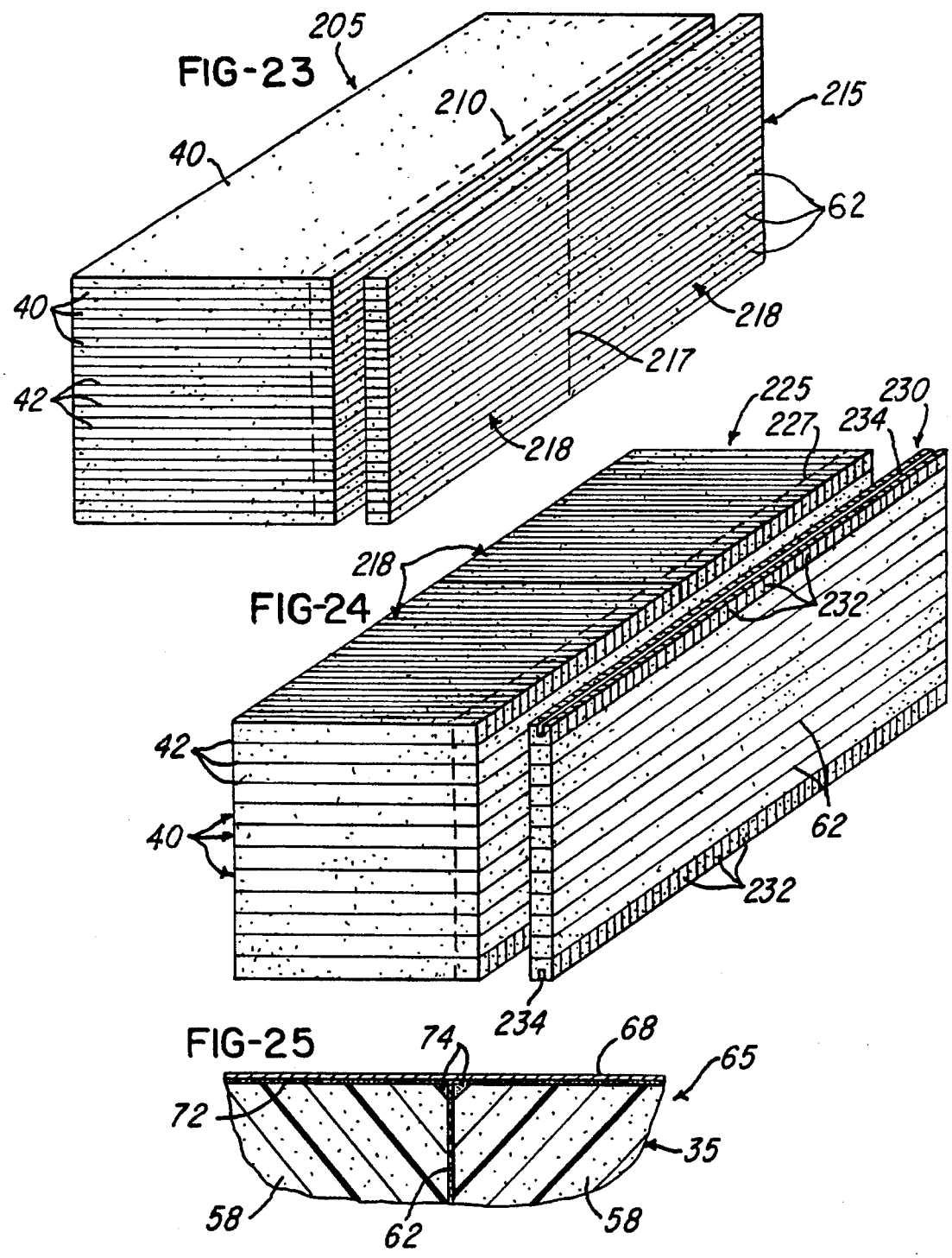

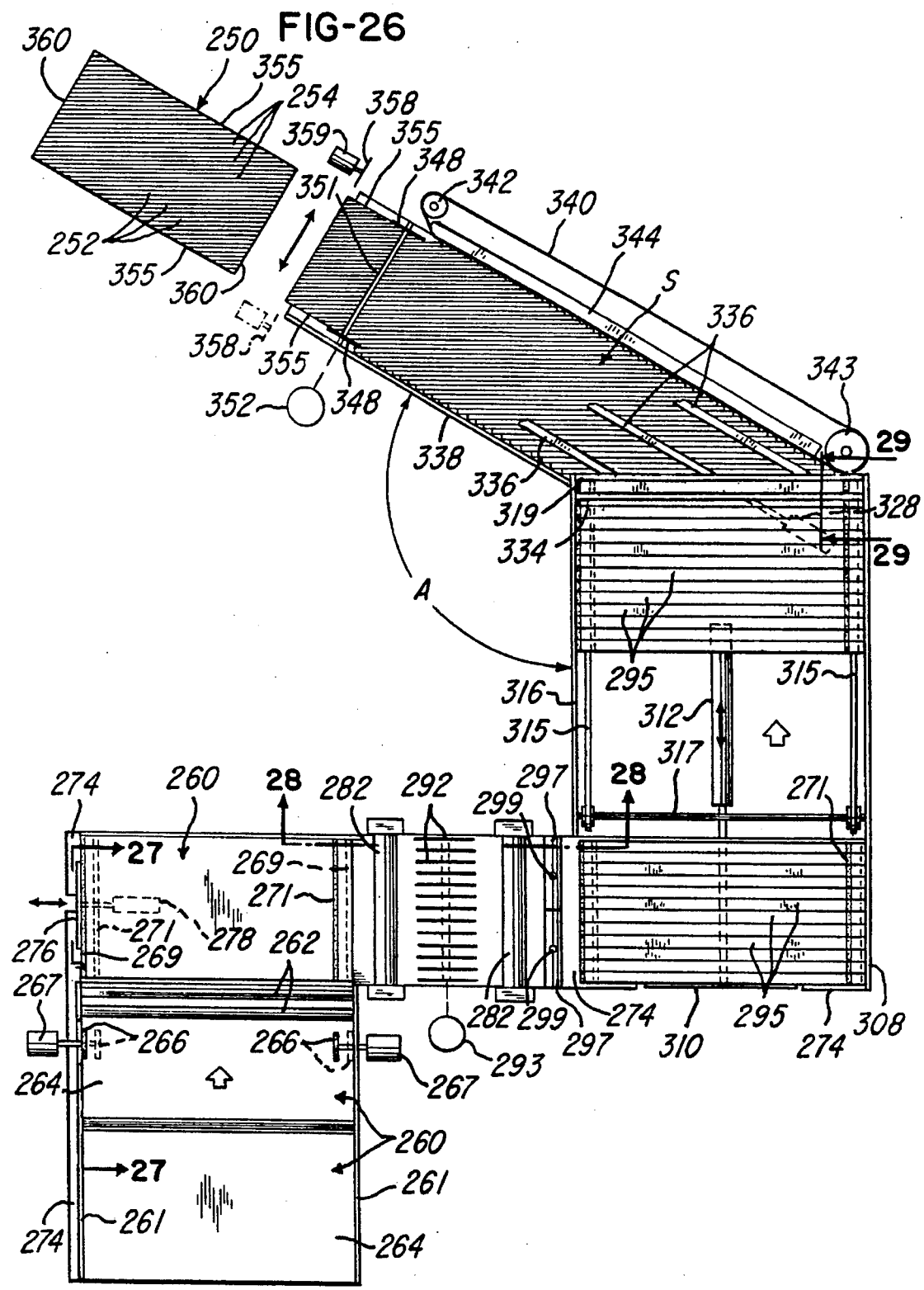

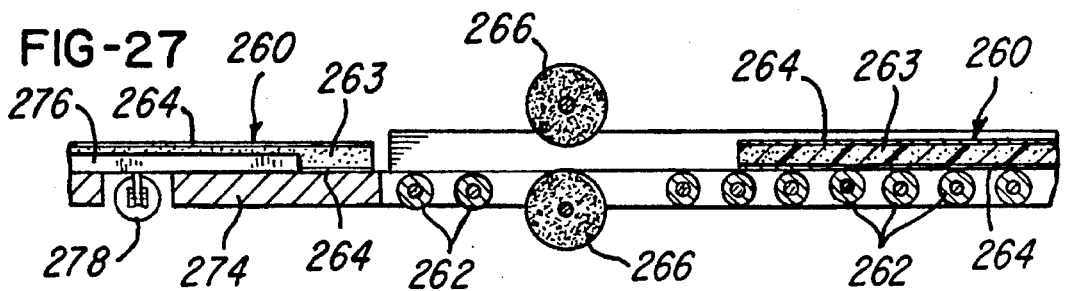
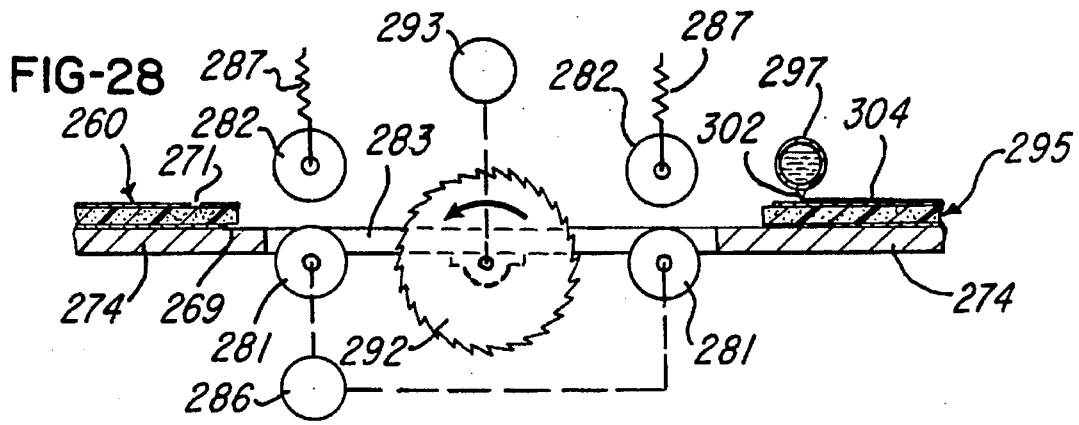
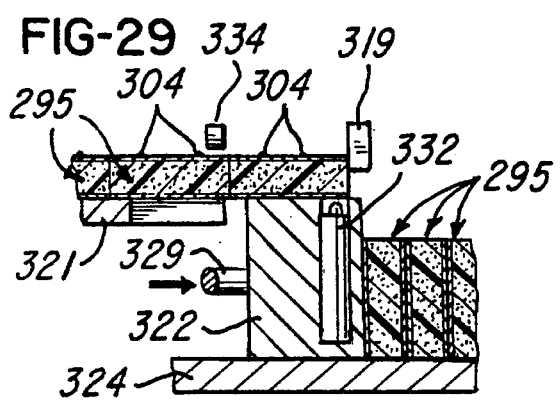
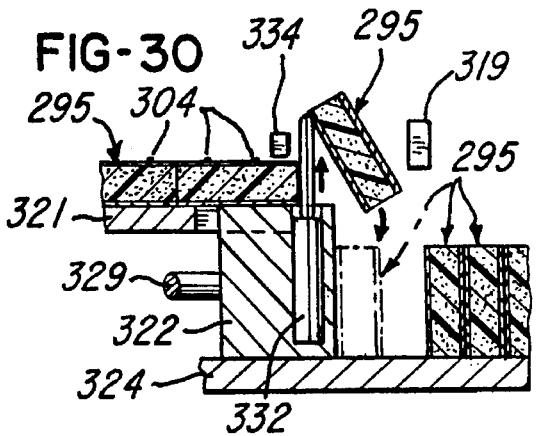
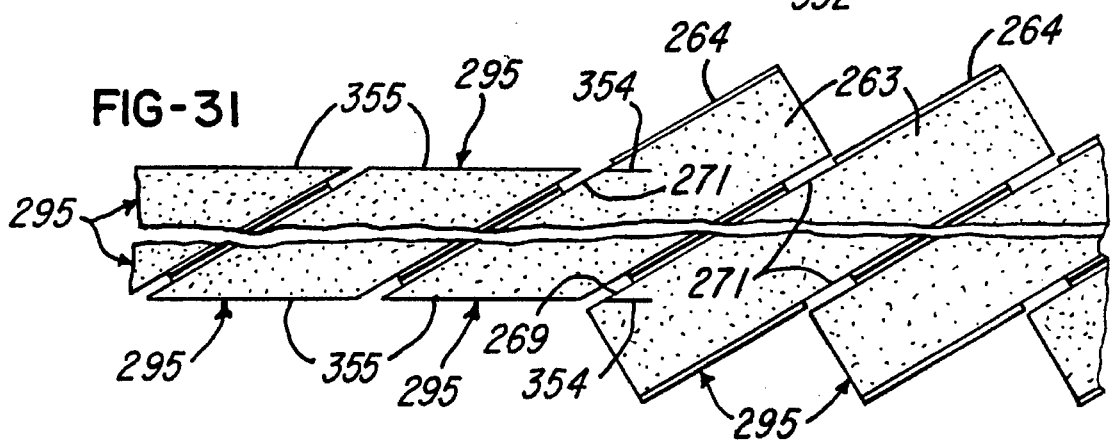

METHOD OF PRODUCTION OF REINFORCED FOAM CORES

RELATED APPLICATION

This application is a continuation-in-part of application Ser. No. 07/877,985, filed May 4, 1992, now abandoned.

BACKGROUND OF THE INVENTION

Sandwich panels are used in a wide variety of applications requiring structural and/or thermal insulation properties. These applications include structural and non-structural uses in refrigerated and non-refrigerated buildings, boats, aircraft, rapid transit and recreational vehicles, and enclosed trailers. Structural panels are composite structures formed by bonding two generally thin facings or skins to a relatively thick core material. The skins, which are normally dense and strong, resist compression and tension, while the core, which is normally of relatively weak and low-density material, serves to separate the skins, stabilize them against buckling and resist shear loads.

Two common materials used as cores for sandwich panels are rigid expanded plastic foams and honeycomb materials. The honeycomb core usually comprises a thin sheet material such as paper which is formed into a variety of cellular configurations. The expanded plastic foam cores usually provide much higher levels of thermal insulation than honeycomb, but the honeycomb cores are normally substantially stronger than the insulating foam cores.

Plastic foam core sandwich panels often involve serious compromises in their design and cost due to inherent structural limitations of the rigid foam insulation cores. In addition to the deflection of these panels due to compressive and tensile stresses in the skins, further deflection results from the low shear modulus of the rigid foam material. The thicker the core, the more important shear deflection becomes, to the point of exceeding deflection due to bending. Under a sustained load, the plastic foam core is subject to creep deformation, further increasing panel deflection, with resulting risk of failure of the sandwich panel.

These deficiencies of the core may require excessively heavy and expensive skins to reduce bending deflection. Alternately, the overall stiffness of the panel may need to be improved by increasing the thickness or density of the foam core beyond that desired for insulation purposes, which raises the costs of both material and shipping. The relatively low shear modulus of low density plastic foam cores also allows buckling of thin flat panel skins to occur at relatively low stress levels, again calling for overdesign of skins or higher density foam cores as a compensation. Low shear resistance and the absence of reinforcing elements within the foam core further permit the propagation under stress of cracks or fissures between the core and the panel skins as well as within or through the core itself, with resulting deterioration or structural failure of the panel. Still another difficulty is the low compressive strength of most plastic foams, which allows concentrated or impact loads to distort both skins and core.

Reinforcing ribs of metal, wood, fiberglass reinforced plastic and other materials have been used in foam core sandwich panels to mitigate or overcome the structural limitations described above, and foam plastics have been used to fill the voids in parallel-strip sandwich panel cores for additional stiffening. Although both foam core and ribs contribute to the strength of these panels, the structural contribution of the ribs in such constructions is not fundamentally dependent upon the presence of the foam core, and the ribs do not depend on the foam to perform their structural functions.

Various methods of introducing insulating foams into the cells of honeycomb have been used for the purpose of adding higher levels of thermal insulation to the structurally adequate honeycomb core. These include such approaches as applying foaming chemicals to the honeycomb cells, for example, as disclosed in U.S. Pat. No. 4,330,494 which uses foamable thermosetting resin to fill the cells, and pressing slabs of plastic foam into the cells. However, these processes are difficult to perform, limit the types of foams which can be used to fill the cells of the honeycomb uniformly, or require large capital investment in machinery. As a result, such composite cores have enjoyed little use in most sandwich panel applications, and many honeycomb core products are consequently deficient in insulation.

Sandwich panels with skins of metal, wood, fiberglass reinforced plastics and similar durable materials are widely manufactured by two basic processes. In one process, liquid chemicals, commonly of polyisocyanurate formulation, are injected between the skins, after which they react and expand to form a rigid foam which bonds itself to the skins to form the sandwich panel. The other major method of producing sandwich panels is by adhesive lamination wherein preformed panel skins are bonded by adhesive to cores of rigid foam boards or slabs which have been cut from expanded foam billets or wherein uncured resins and reinforcing materials are applied to the surfaces of such foam boards and subsequently cured to form rigid skins.

Sandwich panel laminators use a wide variety of these preformed cores, including polyurethane, polyisocyanurate, extruded polystyrene, expanded polystyrene, polyvinylchloride and foam glass. The use of polyurethane and polyisocyanurate foams in lamination processes is severely restricted in spite of large demand for sandwich panels containing such cores. The cost of such core materials in the form of boards or slabs cut from billets is substantially higher than the cost of chemicals used in foam-in-place processes, a differential of typically two to three times. In addition, since most polyurethane and polyisocyanurate billet stock is manufactured for applications other than sandwich panels, the stock is not usually formulated with physical properties designed primarily for structural sandwich panel use. The best foam stocks having appropriate properties for sandwich panels are produced by very few suppliers and in limited geographic areas.

Polyisocyanurate foam is also produced as board stock with attached facings for use as insulation in roofs and other construction applications. This foam material satisfies common fire performance specifications, is manufactured in large quantities in numerous locations, and is sold as a relatively low priced commodity. In spite of its compelling cost advantages, and the modest structural requirements of most construction panel cores, such insulation has seen very limited use as core material for sandwich panels. Both thickness and flatness of the roof insulation boards have unacceptably wide tolerances for most sandwich panel applications. While planing or sanding the facings eliminates this problem, it also removes the skin part of the foam board having the highest density and strength. Even more serious, available polyisocyanurate foam formulations are not consistently tough enough, and their friability, brittleness and low shear strength can result in serious structural failures. These show up as delamination or foam shear under conditions of structural loading, thermal stress or surface impact.

Plastic foam cores for more structurally demanding sandwich panel applications, such as the hulls of boats, are commonly made of linear or cross-linked polyvinyl formulations, in densities of from 2 to 16 pounds per cubic foot. The high cost of these materials, approximately $2 to $20 per board foot, has prevented their significant use in such major medium to high performance applications as highway trailers and recreational vehicles. A further drawback of the polyvinyl foams and of other thermoplastic foams, such as polystyrene, is serious degradation of their physical properties at temperatures encountered in many transportation environments.

SUMMARY OF THE INVENTION

The present invention is directed to an improved reinforced composite foam core panel and its method of production and which, as one important advantage, provides for significantly reducing the cost of producing foam core sandwich panels having superior structural and thermal insulation properties. As another advantage, the invention provides for producing a reinforced foam core panel which has the optimum structural and thermal insulation characteristics without sacrificing one for the other. A reinforced foam panel or billet constructed in accordance with the invention also has uses other than as a core for sandwich panels, such as in the fabrication of pipe insulation and in blocks which may be machined to a particular shape.

In one embodiment of the invention, the above features and advantages are provided by stacking rigid foam insulation boards and thin flexible fibrous sheets in alternating layers with adhesive between the layers, and then compressing the stack while the adhesive cures to form a core panel or billet. The billet is cut through the alternate layers and along parallel spaced planes to form reinforced foam core panels each having spaced webs formed by strips of the fibrous sheets. The composite core panels are adhesively bonded between skins of rigid sheet materials to form sandwich panels with edge portions of the fibrous webs and the foam between the strips adhesively secured to the skins.

The composite reinforced foam core panels are also stacked with interleaving fibrous sheets and adhesive to form billets which are cut to form rigid foam core panels with grid-like reinforcing webs. The grid-like core panels are stacked in a similar manner to form a billet with the webs extending in X-Y-Z or three different directions, and billets are also formed with composite core panels stacked in a step-like manner and then cut along inclined parallel planes to provide core panels with inclined truss-like webs. In another embodiment, the billets are formed with each reinforced core panel orientated at right angles with respect to adjacent core panels, and resilient foam panels are used between rigid foam boards for producing flexible composite core panels which may be curved.

In a further embodiment, the foam between the webs of grid-like core panels is recessed to expose the webs for bonding a facing material such as stucco to the core panels. Billets are also produced in accordance with the invention with high density and low density foam boards in combination with fibrous webs to form reinforced composite panels with high density surface portions and lower density center portions and reinforced composite core panels are laminated at the top and bottom of a billet after being rotated 90° to form reinforced core panels with additionally reinforced longitudinal edge portions for receiving connecting splines.

According to another embodiment, foam core boards are stacked on an incline with fibrous sheets or strips between the boards and are then cut to form rectangular billets or panels with the parallel spaced reinforcing webs extending diagonally for exposure at all edge surfaces of each panel or billet in addition to the parallel faces of the boards or billets.

Other features and advantages of the invention will be apparent from the following description, the accompanying drawing and the appended claims.

BRIEF DESCRIPTION OF THE DRAWINGS

FIG. 1 is a perspective view of a composite foam core billet and a reinforced foam slab or panel constructed in accordance with the invention;

FIG. 2 is an enlarged and exploded perspective view of a corner portion of the composite billet shown in FIG. 1;

FIG. 3 is a fragmentary perspective view of another reinforced foam core billet and panel also constructed in accordance with the invention;

FIG. 4 is an enlarged and exploded perspective view of a corner portion of the billet shown in FIG. 3;

FIG. 5 is a fragmentary perspective view of another reinforced foam core billet constructed in accordance with the invention;

FIG. 6 is an enlarged and exploded perspective view of a corner portion of the billet shown in FIG. 5;

FIG. 7 is a fragmentary perspective view of a stepped reinforced foam core billet constructed in accordance with the invention;

FIG. 8 is an enlarged and exploded perspective view of a corner portion of the billet shown in FIG. 7;

FIG. 9 is a perspective view of an end portion of a reinforced foam core panel cut from the billet shown in FIG. 7;

FIG. 10 is a view similar to FIG. 9 and showing another reinforced foam core panel cut from the billet shown in FIG. 7;

FIG. 11 is a fragmentary perspective view of a modified reinforced foam core billet also constructed in accordance with the invention;

FIG. 12 is an enlarged and exploded perspective view of a corner portion of the billet shown in FIG. 11;

FIG. 13 is a fragmentary perspective view of another embodiment of a reinforced foam core billet constructed in accordance with the invention;

FIG. 14 is an enlarged and exploded perspective view of a corner portion of the billet shown in FIG. 13;

FIG. 15 illustrates a typical use of a flexible panel cut from the billet of FIG. 13;

FIG. 16 is a fragmentary perspective view of a load bearing wall having a core formed from the panel shown in FIG. 3;

FIG. 17 is fragmentary section of a portion of the wall shown in FIG. 16;

FIGS. 18–22 are views similar to preceding views and illustrating the steps for producing a variable density and reinforced composite core panel in accordance with the invention;

FIGS. 23 & 24 illustrate the steps for producing a reinforced foam core panel with additional reinforced longitudinal edge portions in accordance with the invention;

FIG. 25 is an enlarged fragmentary section of a sandwich panel having a reinforced foam core panel constructed in accordance with the invention.

FIG. 26 is a plan view of a machine for producing reinforced foam core panels or billets in accordance with a modification of the invention;

FIG. 27 is a fragmentary section taken generally on the lines 27—27 of FIG. 26;

FIG. 28 is a fragmentary section taken generally on the line 28—28 of FIG. 26;

FIG. 29 is a fragmentary section taken generally on the line 29—29 of FIG. 26;

FIG. 30 is a fragmentary section similar to FIG. 29 and showing the rotation of a foam board for producing a continuous stack; and FIG. 31 is a plan view of opposite longitudinal edge portions of a core panel as trimmed on the machine shown in FIG. 26 and with the longitudinal center portion broken away.

DESCRIPTION OF THE PREFERRED EMBODIMENTS

FIG. 1 illustrates a method of producing a composite reinforced foam board or panel 35. Alternating layers of rigid closed cell expanded foam boards 40 and thin sheets 42 of flexible fiber glass or other material are stacked to a height corresponding to the desired width of the panel 35. The boards 40 and sheets 42 receive coatings or layers of adhesive resins and are laminated under pressure in a platen press or under a vacuum bag to form a solid billet 55 of a predetermined size, for example, 4'×4'×8'. The adhesive or resin, such as polyurethane or polyester resin which maintains its strength and stiffness at normal environmental temperatures, is selected to stiffen and/or waterproof and/or fireproof or otherwise modify the sheets 42 and is applied to the sheets 42 and/or foam boards 40 prior to stacking. After the adhesive cures and the laminating pressure is released, the billet 55 is cut along parallel spaced planes 56 by a large band saw or other suitable cutting means to form a series of the composite reinforced foam boards or panels 35. Thus each panel 35 has a stack of strips 58 formed by sections of the foam boards 40 and parallel spaced webs 62 which are formed by strips of the interposed sheets 42. The panels 35 may vary in thickness, for example, from less than one-half inch to twelve inches or more, depending upon the use of the panels.

When the fibrous sheets 42 are cut by the band saw, the cutting operation frays the longitudinal edges of the webs 62. Thus when skins are laminated by adhesive to the sides of the panel 35, there may be effective penetration of the adhesive into the fibers to form positive connections of the webs to the skins for providing a higher bond strength. If desired for greater accuracy in thickness or flatness, the foam panels 35 may be planed or sanded on one side or both sides before being laminated to the skins.

It is also within the scope of the invention to form a foam board or panel 35 by first laminating flexible sheets 42 of fiber glass or other racer material to one or both sides of a foam board 40 and then feeding the foam boards with attached facet sheets 42 through a gang saw which cuts the laminated boards into the strips 58 and attached webs 62. The strips 58 may then be stacked and the webs 62 bonded together by adhesive to form the composite foam panel 35. For example, commercially available rigid roof insulation boards or panels each consisting of a closed cell polyisocyanurate foam core bonded on each side during the foaming process to fiber glass or reinforced cellulosic felt racer sheets, such as those manufactured by NRG Barriers, Inc. in Saco, Me., may be fed through a gang saw to form foam strips 58 each having racer strips or webs 62 attached to opposite sides. Thus when the strips are stacked to form a panel 35, double webs 62 are sandwiched between each pair of adjacent foam strips 58.

Referring to FIG. 25, a composite foam core sandwich panel 65 is produced with a composite foam core panel 35 laminated to a pair or set of skins 68 which may be steel or aluminum or other suitable racer material. Each skin 68 is attached to the panel 35 by a layer 72 of adhesive. Prior to applying the adhesive layer 72 to the skin 68 or to the corresponding side surface of the foam core panel 35, the panel 35 may be passed between gangs of rotary wire brushes which are aligned with the webs 62 and form beveled corners 74 along the length of each foam strip 58 to expose the longitudinal edge portions of each web 62. Thus when the adhesive layer 72 is applied, the adhesive forms the fillets 74 and provides a stronger bond between the edge portion of each web 62 and the adjacent skin 68 for increasing the strength and stability of the foam core sandwich panel 65.

Referring to FIGS. 3 and 4, the composite reinforced foam boards or panels 35, which may be provided with beveled corners 74, are arranged in a stack with a fibrous sheet 42 located between each pair of adjacent panels 35 after adhesive is impregnated into the sheets 42 or applied to the surfaces of the panels 35. This stack of alternating panels 35 and sheets 42 is compressed until the adhesive cures to form a billet 80 which may have the same dimensions as the billet 55. The billet 80 is then cut along parallel spaced planes, one indicated by the dotted lines 82, to form a series of composite rigid foam panels 85 each of which has a grid-like pattern of intersecting continuous and interrupted strips or webs 62. The composite foam panels 85 are ideally suited for use in producing sandwich walls or panels which require high strength such as, for example, in the construction of the bodies of trailers or recreational vehicles or as a core in construction of boat decks and bulkheads where resin impregnated fiber glass skins are built up on opposite sides of each panel 85. It is understood that the fillets 74 may be used along the edge portions of all webs 42 and 62 to provide a higher strength bond or connection between each of the webs 62 and the overlying skin.

If it is desired to produce a panel 85 which may be curved in two directions, for example to produce a reinforced foam core which has a compound curve to form a boat hull, bulky and compressible porous non-woven polyester, fiber glass or other fibrous mats may be used in place of the sheets 42. The panel may then be deformed to the desired compound curvature during the layup of the boat hull. The resin which is used to form the skins penetrates the porous webs between the foam blocks and then hardens to form the tie webs.

It is also within the scope of the invention to produce a panel similar to the panel 85 wherein relatively low density closed or open cell crushable foam sheets or very low density thermoformable plastic sheets with a heat softening temperature substantially less than that of the foam boards 40, are used in place of the fibrous sheets 42 to form the crossing webs. When the panel is curved, for example to form a boat hull, the webs are crushed or are heat-formed and serve to avoid the creation of undesirable gaps or voids between the foam blocks formed from the boards 40.

In reference to FIGS. 5 and 6, the composite foam panels 85 each having a grid-like arrangement of intersecting webs 62, are arranged in a stack with interleaving fibrous sheets 42 with adhesive impregnated into the sheets or applied to the side surfaces of the panels 85. The stack is compressed to form a large block or billet 90 wherein the webs 62 extend in X-Y-Z or three different directions. The billet 90 may be used as a reinforced insulated material for fabrication or may be cut into composite foam slabs or panels for use in making sandwich panels of enhanced strength.

Referring to FIGS. 7 and 8, the composite foam slabs or panels 35 are stacked on an incline in a step-like manner and are adhesively connected or bonded by interleaving fibrous sheets 42 with the stacking angle at 45° or other desired angle. This stack is compressed until the adhesive cures to form a billet 100. When the billet 100 is cut along parallel spaced planes 102 (FIG. 7), which are inclined at 45° with respect to the panels 35, the resulting product is a composite foam panel 110 (FIG. 9) which has longitudinally extending strips or webs 112 formed by the sheets 42 and separating longitudinally extending foam strips 114 formed by the foam boards 40. The foam strips 114 are triangular in cross-sectional configuration, and the webs 112 extend at 45° angles with respect to the side surfaces of the composite foam panel 110.

As shown in FIG. 9, the opposite longitudinal edges of each web 112 are exposed at the side surfaces or faces of the panel 110. Thus when the composite foam panel 110 is sandwiched between suitable skins to form a sandwich foam core panel, the longitudinal edges of the webs 112 are bonded to the skins and form a truss-like arrangement of the webs between the skins to provide foam core panel with substantial strength and stability in both longitudinal and transverse directions, as desired in many applications. As shown in FIG. 10, when the billets 100 are cut by the band saw along parallel spaced planes 118 (FIG. 7), the resulting product is a composite foam panel 120 having longitudinally extending strips or webs 122 arranged in a crossing or X-shaped pattern. When a composite foam panel 120 is adhesively laminated to skins to form a sandwich foam core panel, longitudinal edge portions of the crossing webs 122 are bonded to the skins in the same manner as described above to form sandwich panels with high resiliency and impact resistance for applications such as boat hulls.

FIG. 11 illustrates another billet 130 constructed in accordance with the invention and wherein composite foam core panels 35 are stacked and adhesively bonded together with the strips or webs 62 in each panel 35 extending perpendicular to the webs 62 of each adjacent panel 35 for the purpose of producing a reinforced foam block or billet which may be cut or fabricated for different applications. If desired, fibrous sheets 42 may be adhesively bonded between the panels 35 to provide increased strength and stability when the billet 130 is cut.

In reference to FIGS. 13–15, a billet 135 is formed by stacking rigid foam boards 40 and resilient closed or open cell foam panels 138 in an alternating manner and with a layer of adhesive between each interface. The billet 135 is then cut along parallel spaced planes, one shown by the dotted line 142, to form flexible composite foam panels 145. One application of the panels 145 is shown in FIG. 15 wherein a conduit or pipe 148 is wrapped with flexible panels 145 for thermally insulating the pipe and the fluid flowing through the pipe. If desired, fibrous sheets 42 may be interposed between the rigid foam boards 40 and resilient foam panels 138 to provide the panels 145 with increased compression strength in a radial direction. It is also within the scope of the invention to use the prelaminated rigid roof insulation panels with a foam core bonded to fiber glass or foil facers, as mentioned above, in place of the foam board 40 and the interposed fibrous sheets 42.

FIG. 16 and 17 illustrate one application of a composite foam panel 85 with a grid-like arrangement of perpendicular webs 62 to form a load bearing wall for a building. For such application, the side surfaces or faces of each composite foam panel 85 are exposed to heat or a solvent or abrasion so that the faces of the foam blocks between the webs 62 shrink to form recesses or cavities 152 between the webs 62. An aggregate material such as stucco cement 155 is applied to the opposite faces of the panel 85 to provide the panel 85 with resistance to water, fire, etc. in addition to a decorative appearance. The stucco cement fills the cavities 152 and bonds to the exposed edge portions of the perpendicular webs 62 to provide a high strength insulated wall assembly which is reinforced by fiber glass webs. As a result of the perpendicular webs 62 within the composite foam panel 85, the panel is capable of supporting a substantial load and can be used to form a vertical wall of a building without the use of horizontally spaced support columns.

FIGS. 18–22 illustrate the construction of reinforced core panels which vary in foam density through the thickness of tile panels. Referring to FIGS. 18 and 19, a composite foam billet 160 is formed by stacking in an alternating manner high density or web reinforced rigid foam boards 162 and low density rigid foam boards 164. The top and bottom high density foam boards 162 have a thickness one-half the thickness of the intermediate high density foam boards 162. The foam boards are adhesively bonded together and compressed, and after the adhesive cures and the compression pressure is released, the billet 160 is cut along parallel spaced planes to form a series of composite foam panels 165 each having alternating strips 166 of high density foam and alternating strips 168 of low density foam. If desired, thin sheets 42 may be inserted between the foam boards 162 and 164 to form web producing strips within the foam panels 165.

Referring to FIG. 20, a series of the composite foam panels 165 are arranged in a stack with interleaving sheets 42 and with layers of adhesive to form a billet 170. The billet 170 is cut along parallel spaced planes to form a series of composite reinforced foam panels 175 which have vertically spaced continuous fibrous strips or webs 177 and horizontally spaced strips 178 of high density foam separated by strips 182 of low density foam. The billet 170 may also be cut through the middle of the strips 178 to produce reinforced panels each having a core of low density foam formed by the strips 182 and side surfaces of high density foam formed by the strips 178.

Referring to FIG. 22, a series of panels 175 are arranged in a vertical stack with interleaving sheets 42 and adhesive layers to form a billet 190 which is constructed similar to the billet 80 shown in FIG. 3, that is, with vertical webs 177 intersecting horizontal sheets 42. The billet 190 is cut along parallel spaced planes which intersect the center of the high density foam strips 166 to form a series of composite foam panels 195.

Each of the panels 195 has opposite side surfaces formed by the high density foam boards 162 and a center foam core portion formed by the low density foam boards 164. In addition, each of the panels 195 has a X-Y grid pattern of reinforcing webs 198 formed from sections of the fibrous sheets 42. The vertical webs 198 are interrupted and intersect continuous horizontal webs 198. Reinforced composite foam panels 195 are ideally suited for use as a core within the walls for a recreational vehicle or trailer or refrigerated truck body which commonly receive aluminum or fiber glass reinforced plastic skins. The panels 195 provide for high strength and stability with a high density foam surface behind the skins and a low density center core to provide insulation at a cost significantly lower than the cost of producing the composite foam panel entirely of high density foam.

Referring to FIG. 23, a billet 205 is constructed in the same manner as the billet 55 (FIG. 1) from a stack of rigid foam boards 40 with fibrous sheets 42 positioned between the foam boards 40 and bonded to the boards by layers of adhesive. The billet 205 is cut longitudinally along parallel spaced planes, one indicated by the dotted line 210, to form a series of composite foam panels 215 constructed substantially the same as the panels 35 described above in connection with FIG. 1. Each of the panels 215 is cut in half along a line 217 to form two half panel sections 218.

Referring to FIG. 24, a billet 225 is constructed by stacking a series of foam panels 40 with interspaced fibrous sheets 42 in the same manner as the billet 55 is formed as described above in connection with FIG. 1. However, in the construction of the billet 225, the half panel sections 218 are each rotated 90° and placed as the top and bottom layers of the billet 225 so that the fibrous web strips 62 on the top and bottom layers extend laterally across the width of the billet 225 and are adhesively bonded to the fibrous sheets 42. After the billet 225 is formed, it is cut along parallel spaced planes 227 to form a series of reinforced composite foam panels 230.

Each of the panels 230 is constructed substantially the same as each of the panels 35 with the exception that the longitudinal edge portions of each panel 230 have longitudinally spaced parallel webs 232 which extend laterally across the thickness of the panel 230 and are bonded to the adjacent strips 62 for adding extra reinforcement to the edge portions. A longitudinally extending slot or groove 234 may be formed with each edge portion of each panel 230, and each groove 234 intersects the cross webs 232. The reinforced composite foam panels 230 are ideally suited for use in forming the side walls and ceilings of an insulated refrigeration building or room where rigid splines of wood or other material extend into mating grooves 234 of adjacent panels for connecting the edge portions of the panels. In such installations, the longitudinal edge portions of the insulating panels are subjected to substantial stresses where the panels join together. The cross webs 232 reinforce the edge portions of the panels 230 and permit the panels to withstand substantial lateral forces while also being constructed of a low density foam material.

FIG. 26 illustrates somewhat diagrammatically the plan view of a machine for the continuous production of a rectangular reinforced core panel or billet 250 which may have a thickness, for example, from 2 inches to 4 feet, a width of 4 feet and a length of 8 feet or longer. When the panel 250 is intended to be cut or sliced parallel to the parallel faces of the panel, the panel is usually referred to herein as a billet. The rectangular panel 250 is constructed similar to the reinforced core panel 35 described above in connection with FIGS. 1 and 2 and includes a plurality of strips or boards 252 of rigid plastics foam material, and the boards 252 are separated by the interleaving sheets or strips or webs 254 of flexible fibrous material such as the fiberglass mats impregnated with a resin and described above in reference to the sheets 42 of web material.

As apparent in FIG. 26, the strips or boards 252 and sheets or webs 254 extend diagonally of the panel 250 so that all of the ends of the webs 254 are exposed along all four edge surfaces of the panel. This exposure of the webs 254 along the longitudinal edge surfaces of the panel as well as the lateral edge surfaces of the panel provide for high edge strength in order to obtain stronger joints or connections between abutting edge surfaces of adjacent panels. For example, when spline receiving grooves 234 (FIG. 24) are formed within the longitudinal edge surfaces of the panel 250 for receiving a connecting spline, the end portions of the webs also receive the grooves and extend around the spline to provide for a substantially stronger connection between the panel and the spline.

The machine shown in FIG. 26 is capable of successively producing the panels 250 according to a desired thickness. To produce each panel 250, roof insulation boards 260 or other foam boards with sheets or webs preapplied to one or both surfaces are successively fed into the machine between parallel guide rails 261 which project upwardly from a horizontal platform or table formed by parallel spaced rollers 262 (FIG. 27). As mentioned above, each of the boards 260 may be a rigid roof insulation board or panel 263 consisting of a closed cell polyisocyanurate foam core bonded on each side or face during the foaming process to fiberglass mats or reinforced cellulosic felt facet sheets 264, for example, such as those manufactured by NRG Barriers, Inc. mentioned above.

The panels 260 are successively fed between the rails 261 on the rollers 263 and between upper and lower pairs of grinding wheels 266 (FIGS. 26 and 27) driven by corresponding electric motors 267. The wheels 266 are positioned to remove strips of the facet sheets 264 on the top and bottom of each panel or board 260 at opposite ends of the board to expose corresponding bands 269 and 271 of the rigid foam board 263, for reasons which will be explained later.

After each board 260 passes between the opposing pairs of grinding wheels 266, the board is received on a table or platform 274 (FIG. 27) which supports a pusher bar 276 actuated by a fluid or air cylinder 278. When the piston rod of the cylinder 278 is retracted, the panel 260 moved longitudinally on the table 274 by the pusher bar 276 until the end of the board 260 is picked up by a pair of feed rolls 281 and 282 (FIG. 28) positioned within an opening 283 in the table 274. The lower roll 281 is driven by an electric motor drive unit 286, and the upper roll 282 is urged downwardly against the top of the board 260 with a predetermined force by a set of springs 287. The rolls 281 and 282 feed the board 260 longitudinally through a set of gang saws 292 which are driven by a motor 293. The saws 292 cut the board 260 into smaller boards or strips 295 which are then red by another set or feed rolls 281 and 282 onto an extension of the table 274.

A pair of axially aligned tubular manifolds 297 (FIGS. 26 and are positioned above the table 274 and are supplied with a suitable urethane foam adhesive which is pumped to the manifolds through supply lines 299 (FIG. 26). The bottom portion of the manifolds 297 support a pair of axially spaced nozzles 302 for each of the strips or boards 295 and are effective to apply a pair of parallel spaced and longitudinally extending beads 304 of adhesive along the entire length of each board 295. While not shown in FIG. 26, the next successive batch of boards 295 being fed by the feed rolls 281 and 282 push the preceding batch or set of boards 295 to the position shown in FIG. 26 where the forward ends of the boards 295 are stopped by a guide rail 308. For purpose of avoiding excessive lines, the adhesive beads 304 on the top facer sheets or strips of the boards 295 are not shown in FIG. 26.

A pusher bar 310 (FIG. 26) is connected to the piston rod of a fluid or air cylinder 312 and is positioned on the table extension 274. When the cylinder 312 is actuated to retract the piston rod, the bar 310 pushes the cut set of boards 295 laterally onto a pair of endless conveyor belts 315 and between the guide rail 308 and a parallel guide rail 316. The belts 315 are directed around a set of pulleys mounted on a pair of cross-shafts 317. The belts 315 are driven continuously to move the boards 295 laterally by sliding friction and against a cross stop rail 319 (FIG. 29) positioned above a supporting platform or table 321 having an upper surface flush with the upper runs of the belts 315.

As shown in FIGS. 29 and 30, an elongated pressure member or ram 322 is supported at the end of the table 321 by a platform or table 324 and is guided for reciprocating movement in a linear direction which forms an acute angle with the path of the boards 295 on the conveyor belts 315. The upper surface of the ram 322 is flush with the upper surface of the table 321, and a fluid or air cylinder 328 (FIG. 26) has a piston rod 329 (FIG. 29) for reciprocating the ram 322 between an extended position (FIG. 29) and a retracted position (FIG. 30). When the ram 322 is retracted, a pair of air cylinders 332 within the ram 322 are actuated to extend their piston rods upwardly for flipping or rotating the board 295 supported by the ram 322 through an angle of 90° so that the board drops downwardly onto the table 324 in front of the ram 322, as shown in FIG. 30. A cross rail 334 (FIG. 29) prevents the next successive or adjacent board 295 from elevating with the preceding board 295 when the cylinders 332 are actuated. When the ram 322 is extended (FIG. 29) the board 295 which has been dropped in front of the ram, is pressed by the ram against the preceding board 295 for continuously producing a stack S of the boards 295 while the stack is supported by the table 324 and the adhesive beads 304 cure to connect the boards.

As also shown in FIG. 26, the stack S of boards 295 are confined under rails 336 and between a rail 338 and an endless belt 340. The belt 340 extends around a set of rollers 342 and 343 and along a backup rail 344, and preferably, the belt 340 is formed by an endless belt which moves with the boards 295 and slides along the rail 344 to reduce friction between the boards and the rail 344. The parallel rails 338 and 334 form a predetermined angle A with the parallel rails 308 and 316. For example, the angle A may be on the order of 120° so that the boards 295 forming the continuous stack S extend transversely or at a biased angle relative to the direction of movement of the stack S as the boards 295 are compressed together and advanced in a step by step manner when the ram 322 is extended. Referring to FIGS. 26 and 31, a pair of edge trim saws 348 are supported by a cross shaft 351 driven by an electric motor 352 or by separate motors and are positioned to cut the boards 295 forming the stack S along parallel spaced lines 354 (FIG. 31) for removing the stepped-like end portions of the boards 295 and provide the advancing continuous stack S of boards 295 with smooth parallel longitudinal edge surfaces 355. If the boards or panels 260 with preattached sheets 264 of web material are produced with inclined end surfaces, the edge trim saws 348 may be omitted.

A traveling cut off saw 358 is driven by a motor 359 and is supported by a track (not shown) for lateral movement across the stack S of boards 295. The saw 358 cuts the advancing stack S of boards at longitudinally spaced intervals for successively producing the reinforced foam core board or panels 250 and to provide the boards with smooth parallel end surfaces 360. As a result of the production apparatus or machine shown in FIG. 26, all of the parallel spaced webs 254 of each foam panel or billet 250 extend at an angle of about 30° with respect to the longitudinal edge surfaces 355 so that the ends of the webs are not only exposed at opposite end surfaces 360 of the panel or billet 250 but are also exposed along the longitudinal edge surfaces 355 of the panel or billet. If the billet 250 is cut along planes parallel to the surfaces 355 or 360, the resulting panels have webs inclined relative to the faces of the panels.

As shown in FIG. 31, as a result of the removal of strips or bands 269 and 271 of the facer sheets 264 on each panel 260, the ends of the webs 254 are recessed inwardly from the longitudinal edge surfaces 355 of the panel 250 as determined by the saw cuts 354. Thus either before or after the panel is laminated to parallel spaced skins, the edge surfaces 355 may be precisely machined without the cutting tools contacting and fraying the webs 254 to obtain precision butt joints between the longitudinal edge surfaces of adjacent panels 250 when the panels are assembled together.

While the forms of reinforced foam panels and billets herein described and their method and apparatus of construction constitute preferred embodiments of the invention, it is to be understood that the invention is not limited to these precise forms, method steps and apparatus, and that changes may be made therein without departing from the scope and spirit of the invention as defined in the appended claims.

The invention having thus been described, the following is claimed:

1. A method of producing generally rectangular reinforced foam core panels each having opposite side surfaces and two pairs of generally parallel opposite edge surfaces and adapted for use as a core between parallel skins attached to the side surfaces, the method comprising the steps of forming a plurality of flat boards of rigid plastics foam material with each board having at least one face with an overlying sheet of flexible web material, successively arranging the boards of foam material with the sheets of web material disposed between the boards to form a stack extending in a linear direction and with the boards and sheets of web material extending at a biascol angle relative to the linear direction, successively compressing the stack of boards and corresponding sheets of web material for continuously advancing the stack in the linear direction, adhesively connecting the boards and sheets of web material together within the stack, and successively cutting the stack at parallel spaced locations extending generally perpendicular to the linear direction of the stack to form core panels each having the boards and sheets of web material extending at an acute angle relative to all of the edge surfaces of the core panel and for extending the sheets of web material to all of the edge surfaces of the core panel.

2. A method as defined in claim 1 and including the step of cutting parallel inclined opposite end surfaces on each board.

3. A method as defined in claim 1 and including the step of removing strips of the web material from each board of rigid plastics foam material adjacent opposite ends of each board to facilitate precision machining of corresponding opposite edge surfaces of each foam core panel.

4. A method of producing a generally rectangular reinforced foam core panel having opposite side surfaces and adapted for use as a core between parallel skins attached to the side surfaces, the method comprising the steps of arranging a series of foam boards of rigid plastics foam material in a stack with adjacent foam boards having higher and lower densities and with adhesive disposed between the boards to form a billet, compressing the stack of boards and corresponding sheets of web material forming the billet, cutting the billet along parallel spaced planes to form foam panels with adjacent foam strips having higher and lower densities, arranging a plurality of the foam panels in a stack with sheets of flexible web material and adhesive disposed between the core foam panels to form a second billet, and cutting the second billet along parallel spaced planes to form core panels each having outer layers with a higher density and an inner layer with a lower density and with the sheets of web material intersecting the layers and being substantially flush with the opposite side surfaces of the core panel.

5. A method of producing a generally rectangular reinforced foam core panel having opposite side surfaces and adapted for use as a core between parallel skins attached to the side surfaces, comprising the steps of forming a plurality of flat boards of rigid plastics foam material, arranging the boards of foam material in a stack with sheets of flexible web material and adhesive disposed between the boards, compressing the stack of boards and sheets of web material while the adhesive cures to form a foam core panel having opposite side surfaces with the edges of the sheets of web material substantially flush with the opposite side surfaces, and forming recesses within the foam material to expose edge portions of the sheets of web material to provide for increased bonding of the sheets of the web material to the skins.

6. A method as defined in claim 5 wherein the boards and sheets of web material are adhesively connected by foam adhesive to provide for connecting boards of plastics foam material and bonded sheets of fiberglass material with irregular side surfaces.

7. A method as defined in claim 5 and including the step of successively inserting sheets of resilient foam material between adjacent sheets of web material in the stack to form bendable core panels each having substantial compression strength between the side surfaces.

8. A method of producing generally rectangular reinforced foam core panels each having opposite side surfaces and two pairs of generally parallel opposite edge surfaces and adapted for use as a core between parallel skins attached to the side surfaces, the method comprising the steps of expanding a closed cell plastics foam material between sheets of flexible web material to form a plurality of flat boards of rigid closed cell plastics foam material with each board having opposite side faces with overlying bonded sheets of flexible web material, successively arranging the boards of foam material with the sheets of web material disposed between the boards to form a continuous stack extending in a linear direction and with tho boards and sheets of web material extending at a biased angle relative to the linear direction, successively compressing the stack of boards and corresponding sheets of web material for continuously advancing the stack in the linear direction, adhesively connecting the boards and sheets of web material together within the stack, and successively cutting the stack at parallel spaced locations extending generally perpendicular to the linear direction of the stack to form a succession of the core panels each having the edges of the sheets of web material substantially flush with the opposite side surfaces of the foam core panel and wherein the sheets of web material extend to all of the edge surfaces of each core panel.

9. A method of producing a generally rectangular reinforced foam core panel having opposite side surfaces and adapted for use as a core between parallel skins attached to the side surfaces, the method comprising the steps of forming a plurality of flat boards of rigid plastics foam material with each board having at least one face with an overlying sheet of flexible web material, arranging the boards of foam material in a stack with the sheets of web material disposed between the boards, compressing the stack of boards and corresponding sheets of web material, adhesively connecting the boards and sheets of web material together within the stack to form a reinforced core panel with the edges of the sheets of web material being substantially flush with the opposite side surfaces of the core panel, arranging a plurality of the reinforced core panels in an inclined stack with sheets of flexible web material and adhesive disposed between the core panels to form a billet, and cutting the billet along parallel spaced planes inclined to the core panels and across the sheets of flexible web material at locations which produce a plurality of second core panels each having foam material with parallel opposite side surfaces and continuous strips of flexible web material crossing within each second core panel and converging together at the side surfaces.

10. A method of producing a reinforced foam core panel having opposite side surfaces connected to generally parallel skins, comprising the steps of forming a plurality of flat boards of rigid plastics foam material with each board having at least one face with an overlying sheet of porous and fibrous flexible web material of substantially the same size as the board, arranging the boards of foam material in a stack with the sheets of web material disposed between the boards, compressing the stack of boards and corresponding sheets of web material, adhesively connecting the boards of rigid foam material and sheets of porous and fibrous flexible web material together while maintaining substantial porosity throughout the sheets of web material to form a core panel having opposite side surfaces and with the sheets of web material having edges generally flush with the opposite side surfaces, attaching skins to the side surfaces and the edges of the sheets of web material with resin, and absorbing the resin used to attach the skins throughout the sheets of porous web material to form integral tie webs connecting the skins.

11. A method as defined in claim 5 and further including the steps of arranging a plurality of the core panels in a stack with sheets of the flexible web material and adhesive between the core panels to form a billet, cutting the billet along parallel spaced planes to form a plurality of foam core panels each having opposite side surfaces with intersecting sheets of the web material, and forming the recesses within the foam material to expose edge portions of the intersecting sheets of web material.

12. A method as defined in claim 10 and further including the steps of arranging a plurality of the core panels in a stack with sheets of the porous and fibrous flexible web material and adhesive between the core panels while maintaining substantial porosity throughout the sheets of web material to form a billet, cutting the billet along parallel spaced planes to form a plural ity of foam core panels each having opposite side surfaces and intersecting sheets of porous web material, and absorbing the resin used to attach the skins throughout the intersecting sheets to form intersecting tie webs connecting the skins.

* * * * *